United States Patent [19]

Schwarz

[11] Patent Number: 4,525,998
[45] Date of Patent: Jul. 2, 1985

[54] CLEARANCE CONTROL FOR GAS TURBINE ENGINE

[75] Inventor: Frederick M. Schwarz, Glastonbury, Conn.

[73] Assignee: United Technologies Corporation, Hartford, Conn.

[21] Appl. No.: 404,085

[22] Filed: Aug. 2, 1982

[51] Int. Cl.³ ............................................. F02C 7/18
[52] U.S. Cl. .................... 60/226.1; 60/266; 415/116; 415/138; 415/178
[58] Field of Search .............. 415/177, 178, 126, 127, 415/128, 136, 137, 138, 139, 116; 60/226.1, 262, 266, 39.29, 39.07

[56] References Cited

U.S. PATENT DOCUMENTS

| | | | |
|---|---|---|---|
| 3,304,054 | 2/1967 | Oechslin et al. ................ | 415/134 |
| 4,019,320 | 4/1977 | Redinger, Jr. et al. ............ | 60/226.1 |
| 4,069,662 | 1/1978 | Redinger, Jr. et al. ............ | 60/226.1 |
| 4,101,242 | 7/1978 | Coplin et al. ................... | 415/178 X |
| 4,213,296 | 7/1980 | Schwarz ......................... | 415/116 X |
| 4,230,439 | 10/1980 | Smith, Jr. et al. ............... | 415/138 |
| 4,279,123 | 7/1981 | Griffin et al. .................. | 60/226.1 |
| 4,304,093 | 12/1981 | Schulze ......................... | 60/226.1 X |

Primary Examiner—Carlton R. Croyle
Assistant Examiner—Jeffrey A. Simenauer
Attorney, Agent, or Firm—Norman Friedland

[57] ABSTRACT

Insulation material lines the inner wall of the case of a gas turbine engine and controlled hot and/or cold air is selectively impinged on the outer wall of the case so as to maintain a minimum gap between the outer peripheral edge of the rotating blades relative to their tip seal means for increased thrust specific fuel consumption (TSFC).

3 Claims, 2 Drawing Figures

CLEARANCE CONTROL FOR GAS TURBINE ENGINE

DESCRIPTION

1. Technical Field

This invention relates to gas turbine engines and particularly to an active clearance control that impinges hot and cold air on the engine case and lines the inner wall of the case with insulation.

2. Background Art

It is well known in the gas turbine art that fuel economy is realized by maintaining a close gap between the tips of rotor blades and its peripheral seal. U.S. Pat. No. 4,019,320 granted to I. H. Redinger, Jr., D. Sadowsky and P. S. Stripinis on Apr. 26, 1977 and assigned to the assignee of this patent application exemplifies such a system and the details of which are incorporated herein by reference.

This invention contemplates lining the inner wall of the engine case with insulation material in the vicinity where gap clearance control is being utilized. Because of the use of the insulation, it is also necessary to add a heating source to impinge on the case so as to allow for growth of the case in certain engine operating modes which would otherwise be hindered by the insulation characteristics. The combination of insulation and heating and cooling the outer case affords the advantage of a wider range of gap control. As for example, where the gap excursion is in the range of 30 mils, it can be increased to 50 mils by virtue of this invention. In addition, this invention affords the advantages of allowing the flanges that are utilized for affecting contraction and expansion of the engine case to be reduced in size and the amount of cooling air necessary to contract the case is reduced.

DISCLOSURE OF INVENTION

An object of this invention is to provide for a gas turbine engine cooling and heating impingement means on the engine case lined with insulation to maintain the gap between the tips of the rotating blades and the attendant peripheral seal at a minimum value.

Other features and advantages will be apparent from the specification and claims and from the accompanying drawings which illustrate an embodiment of the invention.

BEST MODE FOR CARRYING OUT THE INVENTION

Figure 1:
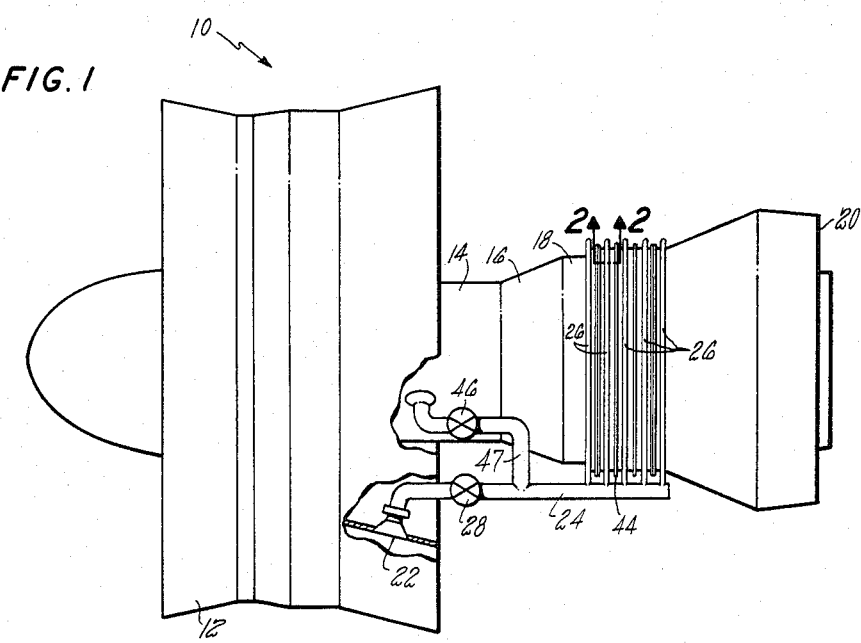
FIG. 1 is a partial view of an aircraft turbine type power plant shown in elevation and schematic illustrating the invention.

Impingement cooling of an aircraft engine case for maintaining gap control as noted above is disclosed and claimed in U.S. Pat. No. 4,019,320, supra, and engines of the type exemplified by the JT9D model manufactured by Pratt & Whitney Aircraft, a division of United Technologies Corporation have typical active clearance controls, and for the sake of convenience and simplicity they are incorporated herein by reference.

In both the examples above, cooling air is impinged on the outside of the unlined engine case to manifest the active clearance control. Typically, at a given point in the engine's operating envelope the cool air is turned on to impinge on the exterior of the engine case causing it to shrink in an attempt to follow the contraction of the blades and rotor adjacent thereto. As noted in FIG. 1, the turbo-fan engine generally indicated by reference numeral 10, typically has the fan section 12, compressor section 14, burner section 16, turbine section 18 and exhaust section 20. The active clearance control comprises a first source of hot air bled from compressor section 14 via line 47 and a second source of cold air bled from the fan section 12 via the fan bleed air scoop 22 and line 24 whereby both lines manifold the compressor discharge air and the fan discharge air to a plurality of spraybars 26 that circumscribe the engine case to impinge air thereon. Thus, at predetermined times in the flight envelope, the valves schematically shown as reference numerals 28 and 46 are selectively turned on to impinge either compressor discharge air or fan discharge air on the engine case.

Figure 2:
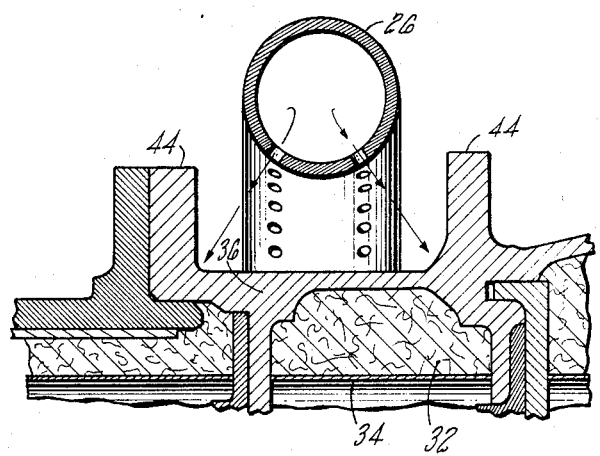
FIG. 2 is a partial view of a section taken along the lines 2—2 of FIG. 1 illustrating the details of this invention and showing the inner diameter of the engine's case.

As noted from FIGS. 1 and 2, according to this invention the engine case is lined with insulation material 32 which is retained in contiguous relationship with the inner diameter by the sheath 34, formed from suitable sheet metal.

The sheath 34 serves to hold the insulation against the inner surface of casing 36 so as to avoid hot or cold spots from occurring due to voids in the material. The insulation removes the influence of the approximately 1000° F. cooling air that is flowing within the case and leaves the case vulnerable to the cold air sprayed on the exterior of the case. Thus, by using hot and cold air impingement with insulation lining in the interior of the engine case, less cooling air is required to provide the same amount of gap control as was heretofore available. Or otherwise, it is possible for moving the case an extended amount say from 30 mils to 50 mils to achieve a closer gap control than was heretofore available. Also, it is possible to reduce the mass of the flanges 44 which receive the spray of hot and cold air that was heretofore realized.

The invention is intended to reduce or close the tipseal clearances during part power operation. During engine start-up, acceleration, and high power operation, the hot air valve 46 is kept open by an external control (not shown) and the cold air valve 28 is kept closed. Thus hot air fed through the line 47 interconnecting the spraybars 26 and a compressor station strikes and expands the turbine case and keeps the tipseals at a radius that allows the turbine to expand transiently without interference. Most importantly, this novel feature enables the case to expand quickly during transients, such as snap accelerations to take-off power, to get out of the way of the expanding rotor, despite the insulating material which would ordinarily encumber this response rate. In short, this part of the system enables the turbine tipseals to endure transients.

An added benefit of this part of the system is it maintains the steady-state temperature level of the case and thus gives the cold air system, to be discussed hereinbelow more of temperature reduction capability to work with.

Once part power operation is achieved, an external control closes the hot air valve 46 and opens the cold air valve 28. Cold air strikes the case and thus the turbine case is shrunk and the tipseal clearance is closed. The insulated turbine case is an internal part of this operation since it removes the influence of the approximately 1000° F. cooling air running within the case and leaves the case vulnerable to the cold air sprayed on its exterior. Without this novel feature, the turbine cause would see only a portion of the temperature reduction it is capable of, since the air within it would effectively control the temperature of the case.

Analytical studies have shown that this system can as much as double the reduction in tipseal clearance of the turbine as compared to a system that sprays air on case without any other treatment.

It should be understood that the invention is not limited to the particular embodiments shown and described herein, but that various changes and modifications may be made without departing from the spirit and scope of this novel concept as defined by the following claims.

I claim:

1. For a fan jet engine for powering aircraft having an engine case supporting a fan section, a compressor section, a combustion section, and a turbine section having rotating turbine blades therein, an active clearance control including a plurality of spraybars circumscribing the exterior of said case in proximity to the rotating turbine blades of one of said sections, a first source of air from said compressor section and a second source of air from said fan section, ducting means interconnecting said spraybars with said source from said fan section and said source from said compressor section, and valve means in said ducting means for selectively turning on and off either source so that one of said sources is operatively connected at a predetermined time of the flight envelope, and insulating lining means attached on the inner circumference of said engine case between said rotating blades and said spraybars for insulating the case from the heat being carried in proximity thereto.

2. For a fan jet engine as in claim 1 wherein said spraybars circumscribe said turbine section.

3. For a fan jet engine as in claim 2 including a sheet metal sheath circumscribing said insulation lining means to hold it in contiguous relationship with the inner surface of said engine case.

* * * * *